United States Patent [19]

Martin et al.

[11] Patent Number: 4,646,025

[45] Date of Patent: Feb. 24, 1987

[54] MAGNETIC PROBE EXPLORATION DEVICE FOR DETERMINING RESIDUAL FOSSIL MAGNETIZATION OF WELL HOLE ROCKS

[75] Inventors: Jean-Pierre H. Martin, Colombes; Jean-Pierre A. Pozzi, Bellevue; Damien M. Despax, Paris, all of France

[73] Assignee: Compagnie Francaise des Petroles, Paris, France

[21] Appl. No.: 732,019

[22] Filed: May 8, 1985

[30] Foreign Application Priority Data

May 15, 1984 [FR] France ............................ 84 07502

[51] Int. Cl.⁴ ...................... G01U 3/26; G01R 33/035
[52] U.S. Cl. .................................. 324/346; 324/248; 324/340
[58] Field of Search ............... 324/226, 248, 339, 340, 324/345, 346, 350

[56] References Cited

U.S. PATENT DOCUMENTS

| 3,391,335 | 7/1968 | Patton et al. | 324/346 |
| 4,349,781 | 9/1982 | Vozoff | 324/346 |
| 4,427,943 | 1/1984 | Cloutier et al. | 324/326 |

Primary Examiner—Ernest F. Karlsen
Assistant Examiner—Walter E. Snow
Attorney, Agent, or Firm—Sughrue, Mion, Zinn, Macpeak and Seas

[57] ABSTRACT

Apparatus for continuously recording, as a function of the depth, the residual magnetization of the rocks through which a well hole passes, comprising, on the one hand, a measurement probe which contains means for measuring the magnetic susceptibility and the magnetic field and, in a cryostat, three gradiometers and, on the other hand, a processing unit which incorporates an integrator (81) for carrying out integration of the data from the gradiometers, a multiplier (76) for multiplying the magnetic field by the magnetic susceptibility, and a subtractor (83) for deducting this product from the result of the integration.

8 Claims, 12 Drawing Figures

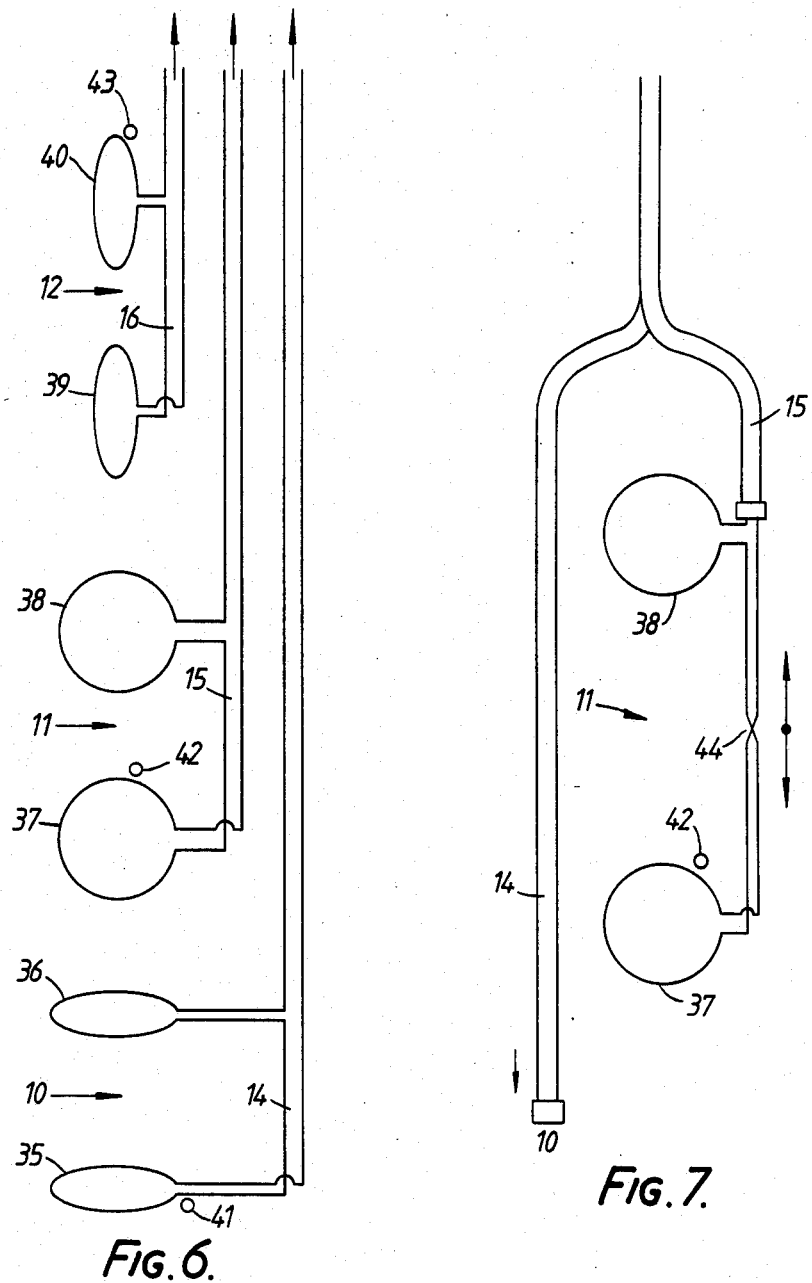

MAGNETIC PROBE EXPLORATION DEVICE FOR DETERMINING RESIDUAL FOSSIL MAGNETIZATION OF WELL HOLE ROCKS

BACKGROUND OF THE INVENTION

The present invention relates to magnetic measurements in a well hole and more particularly to the determination of the residual fossil magnetization of rocks.

It is known that data on the residual magnetization of rocks through which a well hole passes can be obtained by taking a very large number of samples of these rocks, lifting them to the surface and carrying out a highly detailed magnetic analysis of these samples in the laboratory. This procedure is time-consuming and costly.

SUMMARY OF THE INVENTION

The aim of the invention is to permit an in-situ determination of the residual magnetization of rocks by moving in a well hole a probe for magnetic measurements which is connected to a data processing unit arranged on the surface, especially in order to locate the reversals of the earths magnetic field which the rocks have memorized and, if appropriate, to individualize each reversal with its own signature.

For this purpose, the invention provides a magnetic exploration apparatus for a well hole, comprising a probe for magnetic measurements, of a general shape which is elongated along an axis, which contains a means for vector measurement of the magnetic field and which is intended to be moved along the well hole to record, continuously as a function of the depth, certain magnetic properties of the rocks through which the well hole passes, a data processing unit intended to be placed on the surface above the well hole, and an electrical cable connecting the probe to the processing unit to convey to the latter the data acquired by the probe, in which an upper part of the probe contains means for converting electrical values and a lower part of the probe forms a cryostat maintained at a superconductivity temperature and containing at least one cryogenic magnetometer arranged as a gradiometer, characterized in that the said cryostat contains three magnetometers arranged as gradiometers relative to the axial direction of the probe, in that the probe also contains a means for measuring the magnetic susceptibility of the rocks and in that the processing unit comprises an integrator for carrying out mathematical integration of the data supplied by the magnetometers arranged as gradiometers, a multiplier for generating the product of the data received by the means for vectorial measurement of the magnetic field and the measured magnetic susceptibility, and a subtractor for deducting this product from the result of the integration supplied by the integrator, in order to obtain data relating to the residual magnetization of the rocks and in particular to reversals of this magnetization.

BRIEF DESCRIPTION OF THE DRAWINGS

Other features will emerge from the description of examples of embodiment which will be given, without implying a restriction, with reference to the attached drawing in which:

FIGS. 6, 7, 8, 9 and 10 show various configurations of these pairs of coils;

DETAILED DESCRIPTION OF THE PREFERRED EMBODIMENTS

Figures 1, 5:
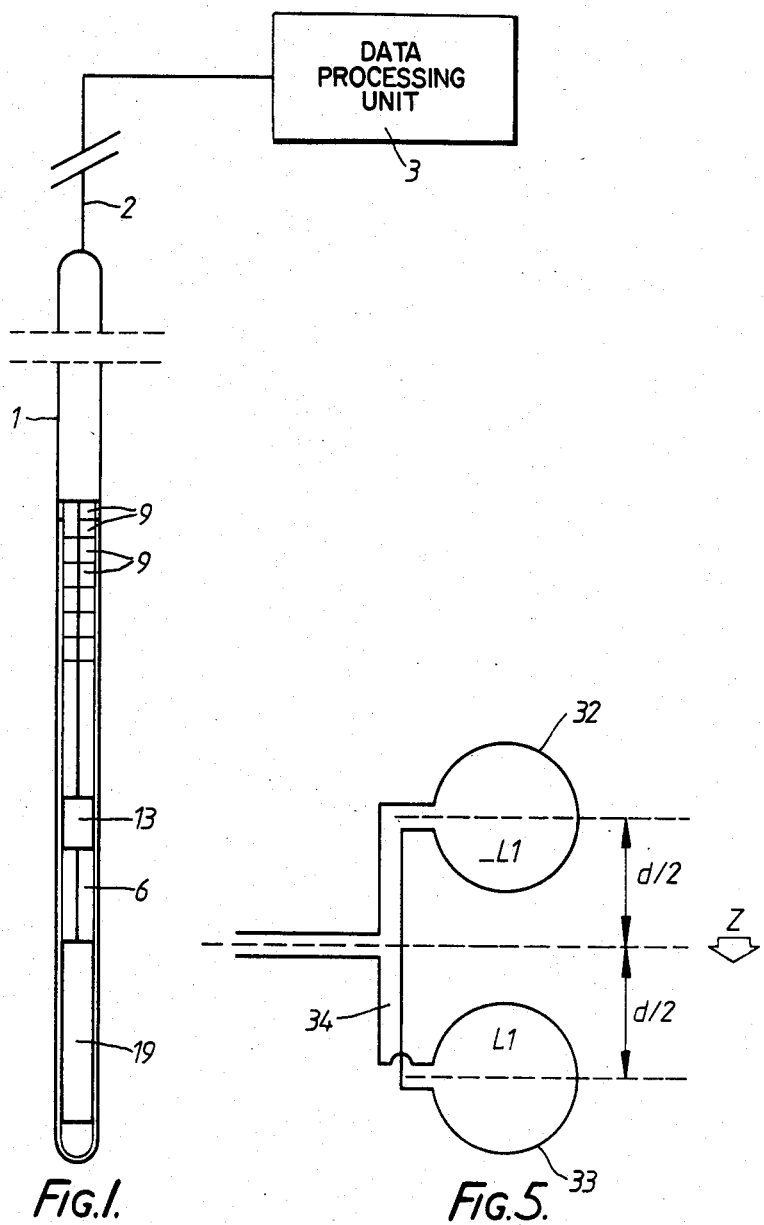
FIG. 1 is a diagrammatic general view of the apparatus.
FIG. 5 shows a pair of gradiometer coils.

FIG. 1 shows a probe for magnetic measurements 1 which is intended to be lowered into a well hole and to be moved along the latter to generate a logging, while being connected by an electrical cable 2 to a data processing unit 3 arranged on the surface.

Figure 2:
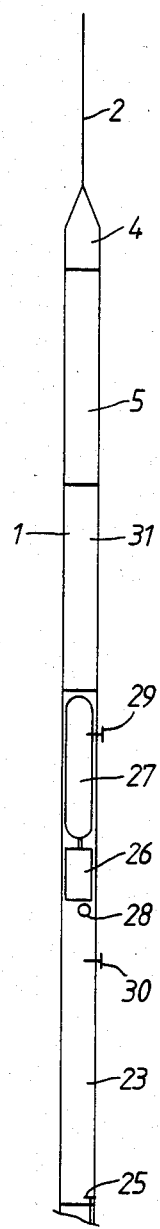
FIGS. 2 and 3 show diagrammatically the probe for this apparatus, the cryostat of which is shown on a larger scale in FIG. 4.
Figure 3:
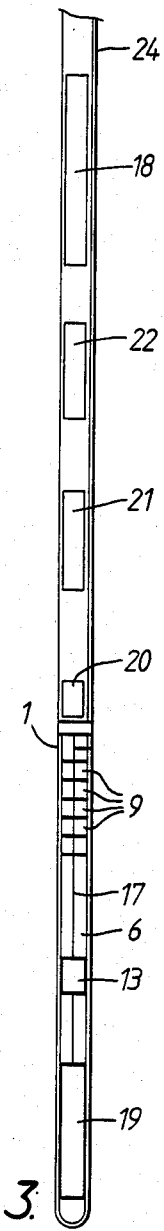
Figure 4:
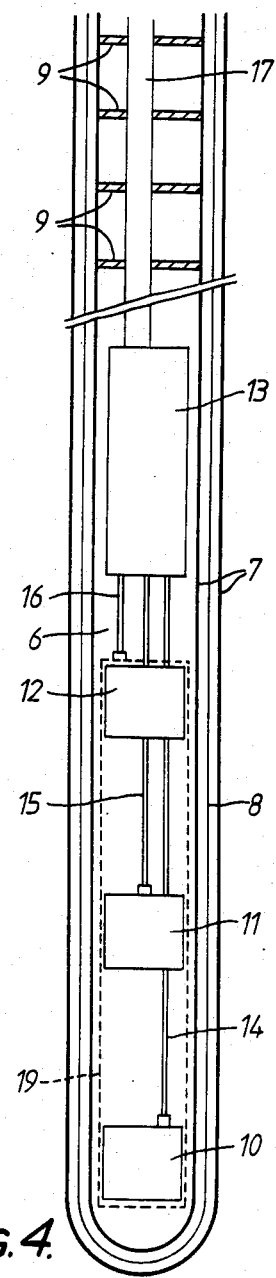

FIGS. 2 and 3 show, from the top downwards, all the apparatus present in the probe 1. In the upper part of the probe, under the head 4 of the latter, is a compartment 5 containing multiplexing and transmitting electronics. The lower part of the probe forms a cryostat 6 bounded by a double wall 7 made of a fibre-reinforced synthetic resin, inside which is arranged a heat screen 8, as can be seen in FIG. 4. This cryostat is insulated thermally at its upper part by heat screens 9.

The three magnetometers arranged as gradiometers have been shown by the location of their measuring coils 10, 11, 12 which sense the gradient, relative to the axis z of the probe, of the magnetic field component, respectively, along the axis z and along two other axes x and y, perpendicular to each other and to the z axis, and by the location of the measurement probes 13 known as "SQUID" (Superconducting Quantum Interference Device) to which these measuring coils are connected by coaxial cables 14, 15 and 16, respectively. A coaxial cable 17 connects the "SQUIDs" to an acquisition electronics compartment 18, passing through the heat screens 9. The set of induction measurement coils 10, 11, 12 is surrounded by a metal screen 19.

Between the cryostat 6 and the acquisition electronics compartment 18 there has been arranged an apparatus for measuring the magnetic field 20, an apparatus for measuring magnetic susceptibility 21 and an inclinometer 22. All this apparatus is connected electrically to the acquisition electronics compartment 18.

The cryostat 6 is bathed with liquid helium. Because of the evaporation of the liquid helium, steps must be taken to keep the pressure in the cryostat below a safety limit. A drain which connects the cryostat to the surface may be installed for this purpose. This drain may consist of a hollow strand provided in the cable 2 connecting the probe and the surface.

It would also be possible to instal a closed circuit capable of reliquefying the helium vapour.

In the example shown, provision has been made for the combined installation, on the one hand, of a large-capacity chamber 23 which is evacuated before the probe is lowered into a well hole and which is connected to the top of the cryostat 6 by means of a narrow conduit 24 and a valve 25 calibrated at 1,050 millibars which will be the operating pressure in the cryostat and, on the other hand, of a miniaturized armoured compressor 26 and a chamber 27 intended to receive the helium coming from the chamber 23 and compressed by the compressor 26 when the latter is started up by a pressure-measuring apparatus 28, as soon as a specified pressure level is detected in the chamber 23. The compressor 26 makes it possible to establish a high pressure of helium in the chamber 27 and to vent helium, if appropriate, out of the probe 1 via a safety valve 29. In addition, the chamber 23 is connected to the outside via a safety valve 30. These valves 29 and 30 are also equipped with a purging system which the operator can trigger when the probe returns to the surface in order to produce an equalization of the internal and external pressures before the probe is disassembled.

The chamber 23 may also be the only one employed if its capacity is sufficient. Conversely, the chamber 27 may be the only one employed, the compressor 26 in this case drawing gaseous helium directly from the cryostat 6 without the intervention of an initially evacuated chamber 23.

A gamma-ray apparatus 31 has been provided under the compartment 5. The internal electrical connections between, on the one hand, the magnetometers in the cryostat 6, the measuring apparatus 20, 21, 22 and, on the other hand, the electronics compartment 18, and between this compartment 18 and compartment 5 and between the apparatus 31 and compartment 5 have not been shown, in order to avoid making the drawing more complicated to understand.

Each of the magnetometers arranged as gradiometers incorporates two coils 52, 53 which are identical but wound in opposite directions, perpendicular to the direction of the magnetic field component the gradient of which is to be measured and separated from each other by a distance d along the axis of the probe, as shown in FIG. 5.

The magnetic field B is defined by component vectors along the axes x, y and z, the modulus of which is respectively Bx, By and Bz. Since the earth's magnetic field is characterized, in sedimentary regions which are unperturbed by human activity, by a very slow change with the depth, the gradient of the earth's magnetic field along the z axis of the probe is negligible, and the gradiometers employed, of the first order or of the second order, eliminate the effect of the earth's magnetic field and provide information due only to the magnetization of the rocks: the magnetization induced by the earth's magnetic field in the rocks and residual magnetization of the rocks.

If the gradients $\delta Bx/\delta z$, $\delta By/\delta z$ and $\delta Bz/\delta z$ are denoted respectively by: Gx, Gy and Gz, the output signal Ix of the gradiometer measuring the gradient of the component Bx of the magnetic field will be: $Ix = L_1 (Gx \times d)$, $L_1$ denoting the area of a coil in the plane perpendicular to the x axis.

In practice, the manufacture of the coils 32 and 33 does not make it possible to obtain areas $L_1$ and $-L_1$ which are strictly identical, the planarity and the parallelism of the two coils are not perfect and the connecting wires 34 give rise, despite the precautions taken, to spurious areas.

If account is taken of the spurious areas $M^x$, $M^y$ and $M^z$, considered along the three axes x, y and z, along which the magnetic field vector is analysed, the area $S_1$, of a coil 32 and that $S_2$ of a coil 33 may be expressed as follows:

$$\vec{S_1^x} = \begin{vmatrix} -L_1 + m_1^x \\ m_1^y \\ m_1^z \end{vmatrix} \quad \vec{S_2^x} = \begin{vmatrix} L_1 + m_2^x \\ m_2^y \\ m_2^z \end{vmatrix}$$

The gradiometer signal is then proportional to:

$$Ix = (\vec{S_1^x} + \vec{S_2^x})\vec{B} + (\vec{S_2^x} - \vec{S_1^x})\frac{\vec{Gd}}{2}$$

that is to say:

$$I_x = \begin{bmatrix} m_1^x + m_2^x \\ m_1^y + m_2^y \\ m_1^z + m_2^z \end{bmatrix} \begin{bmatrix} \vec{Bx} \\ \vec{By} \\ \vec{Bz} \end{bmatrix} + \frac{d}{2} \begin{bmatrix} 2L_1 + m_2^x - m_1^x \\ m_2^y - m_1^y \\ m_2^z - m_1^z \end{bmatrix} \begin{bmatrix} \vec{Gx} \\ \vec{Gy} \\ \vec{Gz} \end{bmatrix}$$

an expression which is of the form:

$$I_x = \begin{bmatrix} \epsilon x^x \\ \epsilon y^x \\ \epsilon z^x \end{bmatrix} \begin{bmatrix} \vec{Bx} \\ \vec{By} \\ \vec{Bz} \end{bmatrix} + L_1 \cdot d \cdot \vec{Gz} + \frac{d}{2} \begin{bmatrix} \eta x^x \\ \eta y^x \\ \eta z^x \end{bmatrix} \begin{bmatrix} \vec{Gx} \\ \vec{Gy} \\ \vec{Gz} \end{bmatrix}$$

(2)        (1)        (3)

The term (1) corresponds to the gradient of the magnetic field which is to be measured. The term (2) corresponds to the effect of the magnetic field B on the spurious areas. The term (3) corresponds to the effect of the magnetic field gradient on the spurious areas. It is small relative to the terms (1) and (2) and may be neglected.

Conventional coil-winding techniques make it possible to restrict the spurious areas to approximately $10^{-3}$ of the useful area. The addition of compensating devices such as superconducting loops in the vicinity of some whorls makes it possible to reduce the apparent residual spurious areas to values of the order of $10^{-4}$ or $10^{-5}$ of the useful area.

The characterization of the gradiometer consists in determining the apparent residual spurious areas experimentally by using known fields or field gradients, and then introducing the values determined in this way into the calculation of term (2) and, if appropriate of term (3), when this last term is not neglected in order to deduct these correcting terms from the signal obtained to have the accurate value of the required term (1). This calculation is carried out in the processing unit 3.

In the construction of the gradiometer coils an attempt is made to arrange the centres of the gradiometers using dimensions which are as close as possible and to make the distances between the two coils of each gradiometer as similar as possible.

FIG. 6 shows a configuration which is that chosen in the example of FIG. 4, where the pairs of coils in the three gradiometers are separate: the pair of coils 35 and 36 for the gradient $\delta Hz/\delta z$; the pair of coils 37 and 38 for the gradient $\delta Hx/\delta z$; the pair of coils 39 and 40 for the gradient $\delta Hy/\delta z$. This configuration has the disadvantage of not being symmetrical and of requiring extensive readjustment of the data because the measurement points are offset, but the resolution in respect of z is the same for each gradient and it is relatively easy to correct the effect of the spurious areas by means of superconducting whorls such as 41, 42, 43 since the pairs of coils are separated.

FIG. 7 shows the configuration of the pair of coils 37 and 38 in greater detail. It is seen that a crossover of the wires connecting the coils 37 and 38 has been provided at a point 44 to compensate for the effect of the magnetic field on the area bounded by these wires. The point 44 is arranged substantially in the middle of the distance between the coils 37 and 38, but the position of this crossover point is adjustable to make it possible to adjust it and to obtain the optimum compensation. The coaxial cable 14 passes through the plane of the coils 37 and 38 at their level so as not to affect the measurement of $\delta Hx/\delta z$. Similarly, the coaxial cables 14 and 15 pass through the plane of the coils 39 and 40 at their level so as not to affect the measurement of $\delta Hy/\delta z$.

Figures 8, 9:
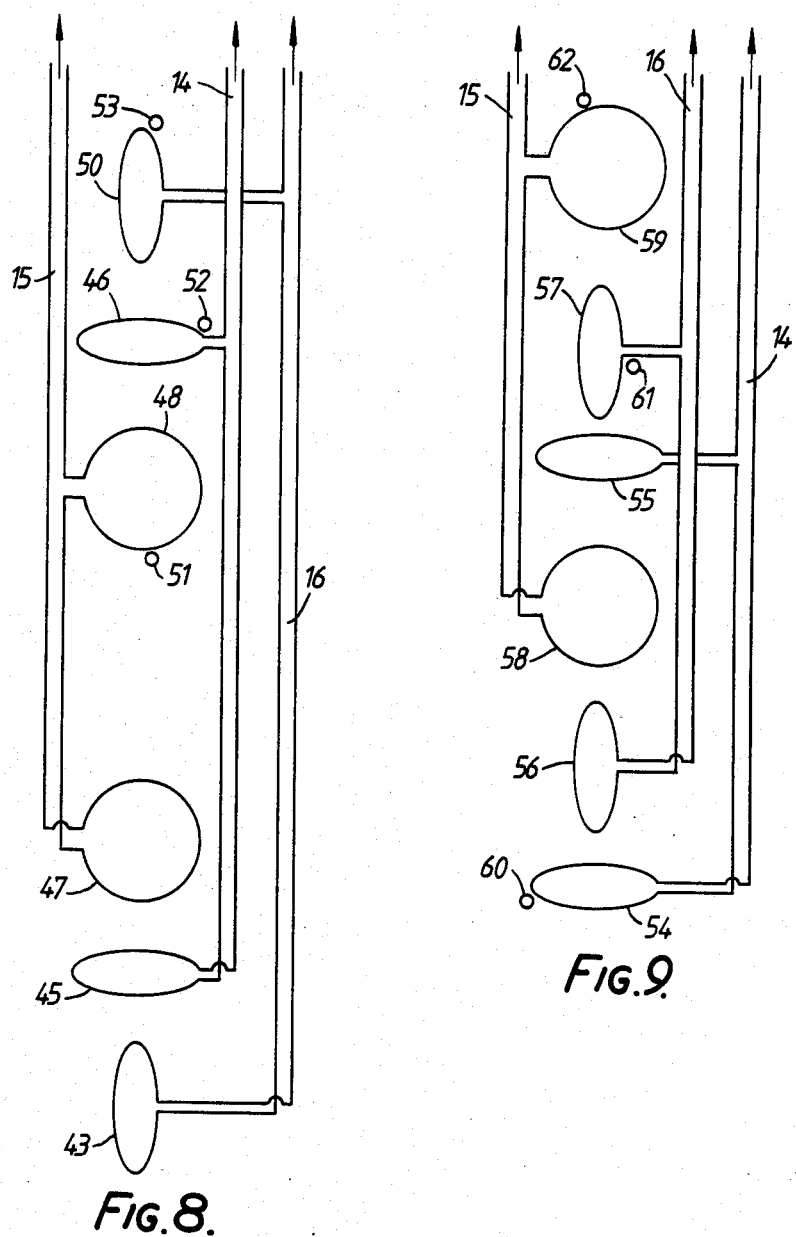

FIG. 8 shows a configuration in which the three pairs of coils have been centred: the pair of coils 45 and 46 at intermediate separation for the gradient $\delta Hz/\delta z$; the pair of coils which are brought close 47 and 48 for the gradient $\delta Hx/\delta z$; the pair of distant coils 49 and 50 for the gradient $\delta Hy/\delta z$. Also shown are the whorls for compensating for the effect of the spurious areas: 51, 52, 53. This configuration is symmetrical, it facilitates the compensation for the spurious areas and it has its three measurement points coinciding. On the other hand, the three gradiometers have a resolution in respect of z which is different.

FIG. 9 shows a configuration in which the three pairs of coils have been offset successively with respect to each other, the two coils of each pair being separated by the same distance: the pair of coils 54 and 55 for the gradient $\delta Hz/\delta z$; the pair of coils 56 and 57 for the gradient $\delta Hy/\delta z$; the pair of coils 58 and 59 for the gradient $\delta Hx/\delta z$. Compensating whorls 60, 61 and 62 have been placed. In this configuration, each gradiometer has the same resolution in respect of z and the compensation is facilitated. However, the measuring points are slightly offset and the system is not symmetrical.

Figure 10:
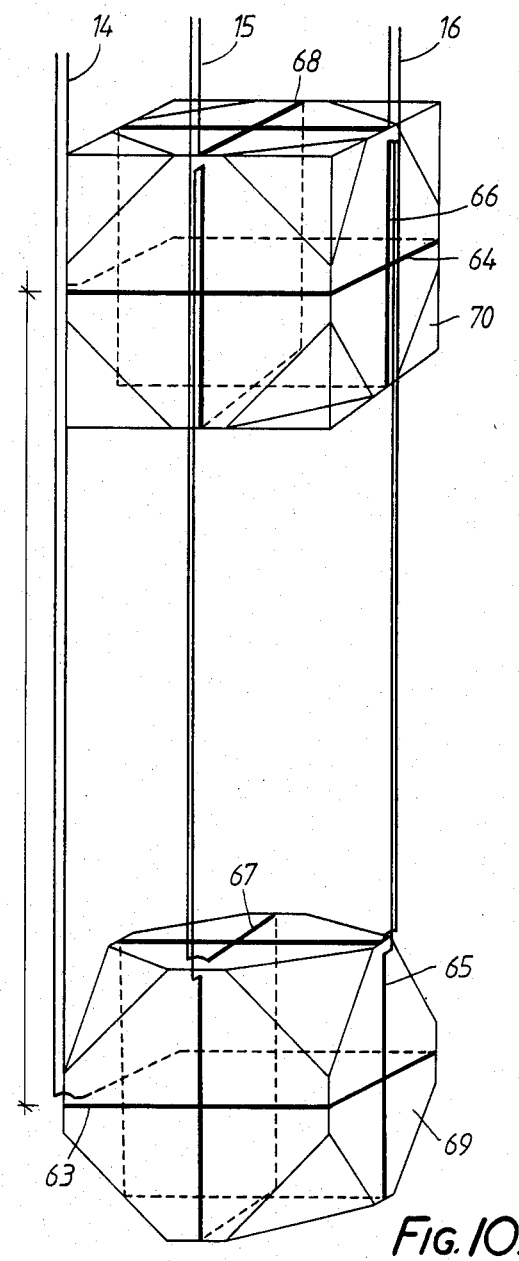

FIG. 10 shows an interlaced configuration of the pair of coils 63 and 64 relating to the gradient $\delta Hz/\delta z$, of the pair of coils 65 and 66 relating to the gradient $\delta Hx/\delta z$ and of the pair of coils 67 and 68 relating to the gradient $\delta Hy/\delta z$, one coil (63, 65, 67) of each pair being mounted on a first insulating block 69 and the other coil (64, 66, 68) of each pair being mounted on a second insulating block 70. In this configuration, each gradiometer has the same resolution in respect of z, the measurement points coincide and the system is symmetrical, but the compensation for the effect of spurious areas is very difficult to obtain physically: in practice it must be achieved by calculation.

The measurement of the magnetic field is essential for two reasons. Firstly, it is necessary to calculate the magnetic field produced in the well hole by the magnetization induced in the rocks by the earth's magnetic field, and this makes it necessary to know the earth's magnetic field vector so that it can be multiplied by the tensor of the magnetic susceptibilities. Furthermore, the interpretation of the gradiometer measurements is only possible when the position of the probe with respect to the fixed reference formed by the direction of the magnetic north and by the vertical is known.

The vector measured by the apparatus 20 is the magnetic field vector in the well hole, but it may be considered as being the earth's magnetic field vector to an approximation which is sufficient for the two uses which have just been indicated.

This magnetic field vector may be measured, for example, by one of the following two procedures. In a first procedure, the three components BX, BY, BZ of this field are measured (for example, using probes of the type known as "fluxgate" or thin-layer), the relative precision obtained being of the order of approximately $10^{-4}$. In a second procedure, the direction of the magnetic field is determined by the orientation adopted by a probe of the "fluxgate" or thin-layer type, an orientation which is perpendicular to the required direction, and the modulus is measured with a nuclear precession magnetometer. If a more precise measurement were to be required, though this is generally unnecessary, provision could be made to arrange a magnetometer in the cryostat 6.

The measurement of magnetic susceptibility may be carried out, in view of the fact that sedimentary rocks have an isotropic magnetic susceptibility, using any conventional method for measuring this susceptibility, for example by the induction probes method using an alternating current with a frequency such that its effects do not interfere with the other measurements. A transmitter-receiver pair with an appropriate spacing is employed to obtain a depth and a height of investigation which are comparable to those of the gradiometers. Reference may be made for this purpose to the communication by G. Clerc and B. Frignet "Logging of electrical conductivity and magnetic susceptibility using the Romulus induction probe" (Application to mining research-Proceedings of the 7th European colloquium on logging-Paris, 1981). In the case where an inadequate approximation was made by considering the magnetic susceptibility to be isotropic, it would be possible to provide for a measurement of the values $\chi_X$, $\chi_Y$, $\chi_Z$ of the susceptibility along the axes X, Y and Z. The magnetization J induced in the rock is then made up of components:

$$J_X = B_X \chi_X$$

$$J_Y = B_Y \chi_Y$$

$$J_Z = B_Z \chi_Z$$

Figure 11:
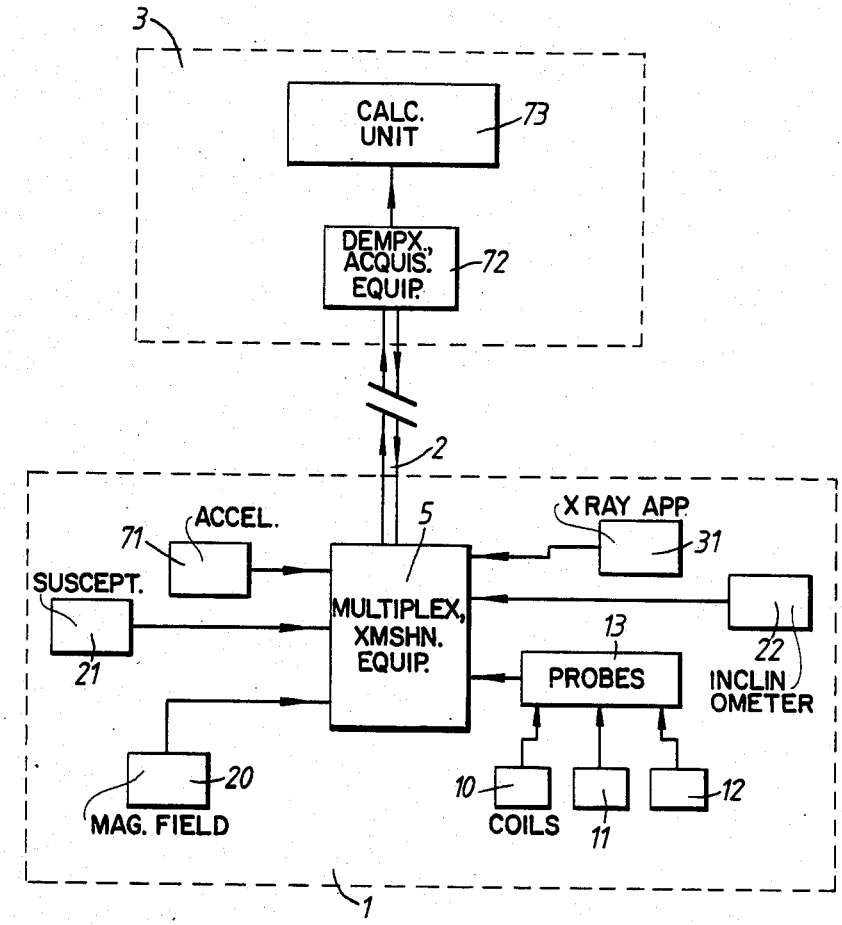
FIG. 11 shows diagrammatically the manner in which the data are collected by the probe and transmitted to the processing unit.

FIG. 11 shows diagrammatically how the various data are collected by the probe 1 and transmitted to the processing unit 3. It shows the electronic multiplexing and transmission compartment 5 which receives the data sensed by the gamma ray apparatus 31, the inclinometer 22, the "SQUID" probes 13, the apparatus for measuring the magnetic field 20, the apparatus for measuring the magnetic susceptibility 21 and also an axial motion accelerometer 71 which has not been shown in FIGS. 2 and 3 and which is not, in fact, essential. The coaxial cable 2 permits signal exchanges between the compartment 5 of the probe 1 and demultiplexing and acquisition electronics 72 of the surface unit 3. The probe 1 thus receives commands from the surface and sends to the surface information on the data which it has collected. The electronics 72 send these data to a calculating unit 73 which processes these data in accordance with a program.

Figure 12:
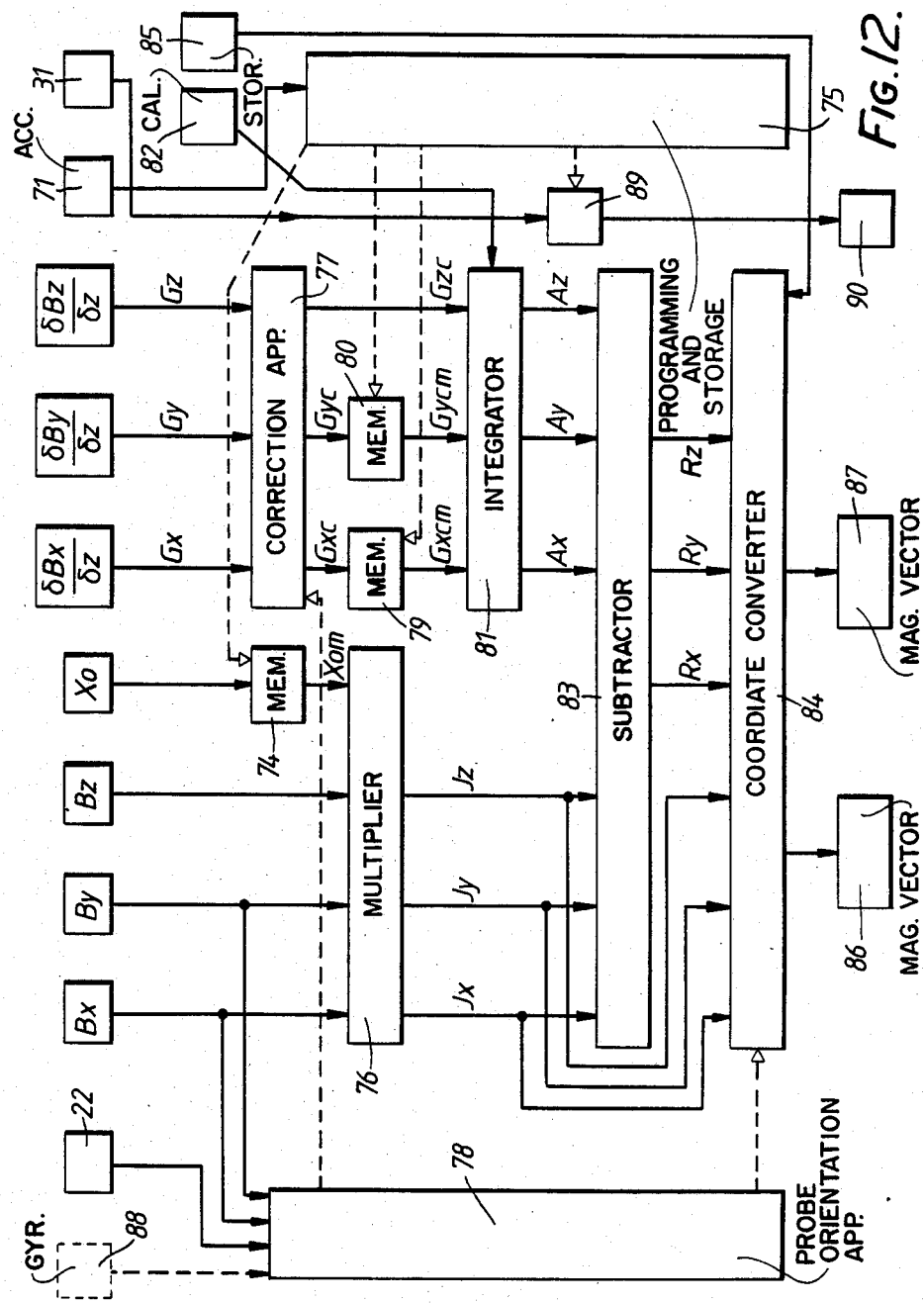
FIG. 12 shows diagrammatically the principal operations carried out in the processing unit.

FIG. 12 shows diagrammatically the operations which need to be carried out in the unit 73. These operations are substantially:

multiplication of the magnetic field vector B defined by its coordinates $B_X$, $B_Y$, $B_Z$, by the magnetic susceptibility $\chi_0$ previously stored in a memory 74 in order to be able to take into account different elevations of measurement and which is adjusted to the value $\chi_0$ relating to the elevation, referred to as that of measurement, which corresponds to the elevation of measurement of the gradient dBz/dz, all the remaining measurements being adjusted to this same elevation of measurement by means of a programming and storing unit 75, which has been monitored by the accelerometer 71 in the present case, a multiplication which is carried out in a muliplier 76 the output of which produces the induced magnetization vector $\vec{J}$ defined by its components: $J_X$, $J_Y$, $J_Z$;

correction of the measurements of the magnetic field gradients $G_X$, $G_Y$, $G_Z$, in an apparatus 77, referred to as "digital characterization" receiving information from a device 78 for determining the orientation of the probe and taking account of the term (2), defined earlier, which corresponds to the effect of the magnetic field on the spurious areas of the coils, to yield corrected measurements of gradients $G_{Xc}$, $G_{Yc}$ and $G_{Zc}$;

memory storage of the measurements of the gradients $G_{Xc}$ and $G_{Yc}$ in the memories 79 and 80 so as to obtain the measurements $G_{Xcm}$ and $G_{Ycm}$ adjusted to the elevation of measurement, in accordance with the program of the unit 75 which itself depends on the distances between the elevations of the various measurements;

filtering and integration of the results of gradient measurements in an integrator 81 which receives from a calibrator 82 calibration data resulting from measurements made outside the well hole or in the latter, by virtue of internal field or gradient standards and which gives the components $A_X$, $A_Y$, $A_Z$ of the magnetization vector $\vec{A}$;

subtraction of the vectors $\vec{A}$ and $\vec{J}$ in a subtractor 83 which gives the natural residual magnetization vector $\vec{R}$ as its components $R_X$, $R_Y$, $R_Z$, such that:

$$R_X = A_X - J_X, \ R_Y = A_Y - J_Y, \ R_Z = A_Z - J_Z;$$

conversion to the geographical coordinates in a coordinate converter 84 receiving information from the device for determining the orientation of the probe 78 and from a device 85 for storing the magnetic declination entered during calibration and yielding at 86 the components of the induced magnetization vector and at 87 those of the residual magnetization vector.

The unit 78 receives information from the inclinometer 22 and the measurement of the magnetic field components $B_X$ and $B_Y$. In the case of a volcanic formation where the rocks are strongly magnetized, the determination of the probe orientation relative to the local magnetic field can no longer be carried out with satisfactory precision. In this case, an independent orienting device 88, such as a gyroscope, must be employed in addition to or in place of the means for orienting the probe relative to the magnetic field.

Provision has also been made for storing in a memory 89 the information supplied by the gamma ray apparatus 31 in order to obtain them at 90, referred to the elevation of measurement.

In the course of preliminary trials it was found that this apparatus made it possible to accentuate in a highly satisfactory manner the reversals in the residual magnetization of rocks, which considerably increases the potential of magnetostratigraphy.

We claim:

1. Magnetic exploration apparatus for a well hole, comprising a probe for magnetic measurements (1), of a shape which is generally elongated along an axis, which contains a means for vectorial measurement of a magnetic field (20) and which is movable along the well hole to record, continuously as a function of the depth, certain magnetic properties of the rocks through which the well hole passes, a data processing unit (3) disposed on the surface above the well hole, and an electrical cable (2) connecting the probe to the processing unit to convey to the latter the data acquired by the probe, in which an upper part of the probe contains means connected between the cable and measuring devices in the probe for converting electrical values (5) and a lower part of the probe forms a cryostat (6) maintained at a superconductivity temperature and containing at least one cryogenic magnetometer arranged as a gradiometer, characterized in that the said cryostat (6) contains three magnetometers (10, 11, 12) arranged as gradiometers relative to the axial direction of the probe, in that the probe (1) also contains a means for measuring the magnetic susceptibility of the rocks (21) and in that the processing unit (3) comprises an integrator (81) for carrying out mathematical integration of the data supplied by the magnetometers arranged as gradiometers, a multiplier (76) for generating the product of the data received by means for vectorial measurement of the magnetic field (20) and the magnetic susceptibility measured by the said means for measuring the magnetic susceptibility, and a subtractor (83) for deducting this product from the result of the integration supplied by the integrator (81) in order to obtain data relating to the residual magnetization of the rocks and in particular to reversals of this magnetization.

2. Magnetic exploration apparatus according to claim 1, characterized in that the processing unit (3) also incorporates an apparatus (77) for correcting the measurements of gradients provided by the magnetometers (10, 11, 12) on the basis of received information on the magnetic field and the orientation of the probe (1), and for calculating the spurious effect which the magnetic field exerts on each magnetometer as a result of imperfections in the construction of the latter.

3. Magnetic exploration apparatus according to claim 1, characterized in that the processing unit (3) also incorporates memory means (74, 79, 80) for storing certain measurements, and a programming and storing unit (75) for adjusting values derived from the group of measurements carried out to a same elevation of measurement.

4. Magnetic exploration apparatus according to claim 1, in which each of the three magnetometers (10, 11, 12) which are arranged as gradiometers incorporate a pair of coils, characterized in that these pairs of coils (35-36, 37-38, 39-40) are separated from each other and are arranged following each other.

5. Magnetic exploration apparatus according to claim 1, in which each of the three magnetometers arranged as gradiometers incorporates a pair of coils, characterized in that each of these pairs of coils (45-46, 47-48, 49-50) has its two coils arranged symmetrically relative to a centre which is common to the three pairs of coils.

6. Magnetic exploration apparatus according to claim 1, in which each of the three magnetometers arranged as gradiometers incorporates a pair of coils, characterized in that the three pairs of coils (54-55, 56-57, 58-59) are offset relative to each other, the two coils of each pair of coils being separated by the same distance.

7. Magnetic exploration apparatus according to claim 1, in which the cryostat (6) contains liquid helium, characterized in that a conduit (24) equipped with a calibrated valve (25) connects the top of the cryostat (6) to an initially evacuated chamber (23) contained in the probe (1).

8. Magnetic exploration apparatus according to claim 1, in which the cryostat (6) contains liquid helium, characterized in that the probe (1) incorporates a pressure chamber (27) connected to a compressor (26) arranged so as to be capable of injecting under pressure into this pressure chamber (27) helium which may be evaporated in the cryostat (6).

* * * * *